: US 6,684,226 B1
(45) Date of Patent: Jan. 27, 2004

(12) United States Patent
Bodilsen

(54) METHOD FOR STORING DATA IN ONE OR MORE FILES SO THAT BOTH PREVIOUS AND NEW VERSIONS OF THE DATA ARE SEPARATELY ACCESSIBLE

(75) Inventor: Svend Bodilsen, Alleroed (DK)

(73) Assignee: Frontline Software ApS, Birkeroed (DK)

( * ) Notice: Subject to any disclaimer, the term of this patent is extended or adjusted under 35 U.S.C. 154(b) by 0 days.

(21) Appl. No.: 09/533,990

(22) Filed: Mar. 24, 2000

(51) Int. Cl.[7] ............................................... G06F 17/30
(52) U.S. Cl. ....................... 707/203; 707/100; 707/201; 707/204; 707/205; 709/217; 717/11; 717/162; 713/185
(58) Field of Search ................................. 707/103, 203, 707/8, 100, 201, 204, 205; 709/217; 717/11, 162; 713/185

(56) References Cited

U.S. PATENT DOCUMENTS

| 5,287,496 | A | * | 2/1994 | Chen et al. ................. 707/203 |
| 5,566,326 | A | * | 10/1996 | Hirsch et al. ................ 703/26 |
| 5,675,802 | A | * | 10/1997 | Allen et al. ................. 707/203 |
| 5,832,483 | A | * | 11/1998 | Barker ........................... 707/8 |
| 5,931,904 | A | * | 8/1999 | Banga et al. ............... 709/217 |
| 6,026,408 | A | * | 2/2000 | Srinivasan et al. ......... 707/103 |
| 6,052,688 | A | * | 4/2000 | Thorsen ...................... 707/100 |
| 6,209,128 | B1 | * | 3/2001 | Gerard et al. ................ 717/11 |
| 6,240,447 | B1 | * | 5/2001 | Banga et al. ............... 709/217 |
| 6,351,813 | B1 | * | 2/2002 | Mooney et al. ............. 713/185 |
| 6,353,878 | B1 | * | 3/2002 | Dunham ..................... 711/162 |

OTHER PUBLICATIONS

Triantafillou et al., "Achieving Strong Consistency in a Distributed File System", IEEE, 1997, pp. 35–55.*
Burns et al., "Version Management and Recoverability for Large Object Data", IEEE, 1998, pp. 12–19.*
"File Server for Local Area Networks" by James G. Mitchell, Palo Alto, CA, Xerox, 1982.

* cited by examiner

Primary Examiner—Charles Rones
Assistant Examiner—Thuy Pardo
(74) Attorney, Agent, or Firm—Birch, Stewart, Kolasch & Birch, LLP

(57) ABSTRACT

System and method for transaction-based versioned file system. A file system assists the users of computer systems to store data on external persistent storage media such as hard disks, the main task for the file system is to move data to and from the external media, traditional file system leaves the user with little or no control over the contents of files across system crashes. As a consequence the contents of the files are undefined after a system crash, and the file system itself may require lengthy recovery routines before the file system can be used again. The transaction based file system provides the user with control of the contents of the files in the file system across system failures, and the transaction based file system does not require lengthy recovery routines after system failure. A number of versions may be maintained at the same time and retrieved independently of each other. The version generation is based on the so-called shadow page principle.

16 Claims, 7 Drawing Sheets

SUPERBLOCK BEFORE COMMITTING 60

SUPERBLOCK AFTER COMMITTING 60

| | CLIENT | OPERATION | FILE | INPUT | OUTPUT |
|---|---|---|---|---|---|
| 2.1 | C1 | WRITE | f1 | "abcd" | |
| 2.2 | C2 | READ | f1 | | "abcd" |
| 2.3 | C1 | WRITE | f2 | "abcd" | |
| 2.4 | C2 | READ | f2 | | "abcd" |

|     | CLIENT | OPERATION | FILE | INPUT  | OUTPUT |
|-----|--------|-----------|------|--------|--------|
| 3.1 | C1     | WRITE     | f1   | "abcd" |        |
| 3.2 | C2     | WRITE     | f2   | "abcd" |        |
| 3.3 | C1     | WRITE     | f1   | "efgh" |        |
| 3.4 | C2     | WRITE     | f2   | "efgh" |        |

API
4.1 CREATE FILE
4.2 OPEN FILE
4.3 READ FILE
4.4 WRITE FILE
4.5 CLOSE FILE
4.6 DELETE FILE
4.7 CREATE TRANSACTION
4.8 COMMIT FILE
4.9 COMMIT TRANSACTION
4.10 ROLLBACK TRANSACTION

DEVICE DRIVER 4.11 INITIALIZE
4.12 READ DEVICE
4.13 WRITE DEVICE
4.14 FLUSH

|  | OPERATION | FILE | INPUT | OUTPUT |
|---|---|---|---|---|
| 5.1 | CREATE TRANSACTION | | | |
| 5.2 | CONNECT | f1 | | |
| 5.3 | WRITE | f1 | "abcd" | |
| 5.4 | CONNECT | f2 | | |
| 5.5 | WRITE | f2 | "abcd" | |
| 5.6 | COMMIT | | | |
| 5.7 | CREATE TRANSACTION | | | |
| 5.8 | CONNECT | f1 | | |
| 5.9 | WRITE | f1 | "efgh" | |
| 5.10 | CONNECT | f2 | | |
| 5.11 | WRITE | f2 | "efgh" | |
| 5.12 | COMMIT | | | |

① ②

FILE CONTENT OF CRASH #1: f1 -> "abcd"
　　　　　　　　　　　　　　f2 -> "abcd"

FILE CONTENT OF CRASH #2: f1 -> "efgh"
　　　　　　　　　　　　　　f2 -> "efgh"

FIG.5

METHOD FOR STORING DATA IN ONE OR MORE FILES SO THAT BOTH PREVIOUS AND NEW VERSIONS OF THE DATA ARE SEPARATELY ACCESSIBLE

The present invention relates to the generation and alteration of a database and in particular to a database where different versions of the data therein should be accessible.

A number of computer/data storage theories and practises exist—one of which is the so-called shadow paging principle which is designed to especially take into account problems often encountered when a number of alterations are desired performed on e.g. a database—alterations which may be interconnected. If this operation fails in the process of altering the data, it may not be possible to actually regenerate the former data in order to attempt the alteration again. Thus, the database is in an unknown and thus undesired state.

Shadow paging solves this problem by not overwriting or deleting data but simply firstly copying and then altering all parts thereof which are required altered as a consequence of the desired alterations of the data. These new parts are stored separately from the former data. The actual data of the shadow paging principle are stored as a number of individually addressable data blocks and a tree structure having at the lowest level nodes—normally termed the leaves of the tree—pointing to these data blocks is generated. Altering a data block will require the copying thereof and performing the alteration on the copy. The address of this new data block is entered into a copy of the tree node pointing to the new data block. This new tree node is also stored at a new address and any node pointing to the former node will also be copied, altered—etc. This process is applied recursively until the root node of the tree has been processed.

This will provide a new set of data blocks of which some are new and some are not amended and thus old—and some old data blocks, which will not be relevant when the commit operation has been successfully completed. Also, a new tree structure is provided part of which is old and part of which is new. Each of these tree structures have a node—and these nodes are different.

The actual commit operation will finally be performed by having an overall pointer to the actual tree structure—and thereby to the actual data structure—point from the old root to the new root. The advantage of this function is that the commit operation is indivisible and is performed in a single operation. This operation can hardly be stopped in the process—whereby the fact that the overall pointer points to the new root will, as a fact, mean that the operation has been completed successfully. If this is not the case, the old root will still be actual—as will the old tree structure and the old data—whereby no alterations have been performed on the data.

This principle however has the disadvantage that upon a commit operation the old data will no longer be available. Thus, it will not be possible to actually retrieve an older version of the data.

The present invention relates to a solution to that problem.

In a first aspect, the invention relates to a method for storing information stored in one or more files on a permanent storage medium, the method comprising:
  storing data transaction-wise according to the shadow paging principle,
  but retaining, in a commit operation, the previous data and their physical storage on the storage medium together with a separate storage on the storage medium representing new data as changes to the previous data, the previous data and the changes together constituting, upon commit, a new version of the data,
  both the previous and the new versions of the data being separately accessible.

In the present context, "transaction-wise" will mean that a transaction is performed wherein all desired alterations to the data or database are assembled and performed in a single operation. This transaction is completed with the commit operation where e.g. the operator "commits" himself to the desired changes where after these are performed on the data.

Upon the commit operation, a new version of the data is generated and stored separately from the older data in a manner so that both the new and old version of the data are separately accessible.

In the standard shadow paging principle, the old data are not accessible upon a successful commit operation.

According to the invention, the old version of the data is separately accessible.

Preferably the data of a file is stored as a number of data blocks and wherein a change of the contents of the file, the previous data, results in a change of the contents of one or more of the data blocks.

Also, preferably, a single commit operation causes all changes, required by the transaction, to be applied to all of the one or more files.

During operation of a program accessing the database, it may be desired that at least a number of previous versions representing the maximum simultaneously outstanding transactions plus two are retained.

By a shadow paging principle it is normally meant that the data are stored as a number of individually addressable data blocks (normally the smallest individually addressable unit in the storage medium), addresses representing the physical storage of the individual data blocks being stored in a tree structure of one or more first data elements, and comprising:
  a) identifying data blocks to be modified,
  b) copying the identified data blocks,
  c) performing the modification(s) on the copied data blocks,
  d) storing the modified data blocks at addresses not coinciding with any of the addressable data blocks or any of the first data elements,
  e) for each identified data block, identifying one or more of the first data elements of the tree structure from a root of the tree structure to the data block,
  f) copying each identified first data element at an address not coinciding with any of the addressable data blocks or any of the first data elements,
  g) replacing, in each copied first data element, the address of the identified data block or first data element with the address of the corresponding modified data block or first data element, and
  h) providing a new root of the modified tree structure and having the new root represent the modified first data element corresponding to the first data element represented by the root of the tree structure.

If a first data element represents addresses of more than one data block having been altered by the procedure, preferably this first data element is only copied, altered and stored once.

A tree structure of the present type comprises a number of nodes (one of which is a root) each having at least two pointers pointing toward leaves or other nodes. Which pointer to choose will be determinable by the property of the desired leaf.

Normally, as mentioned, the commit operation comprises only step h) in shadow paging.

One of the advantages of the shadow paging principle may be seen from the depth of a tree describing a file is determined by the maximum size of the file, and the block size of the underlying physical storage media. The maximum depth of a tree can be expressed as $$tmd=(\log 2(\text{maxFileSize})-\log 2(\text{blockSize}))/(\log 2(\text{blockSize}/\text{pointerSize})$$

If we assume a maxFileSize as 2**32 a block size of 512 and a pointerSize of 4 the maximum depth of a tree is less than or equal to 4. Thus, a memory of 4 GBytes may be described by a tree of depth 4 which means that the tree structure itself uses only $\frac{1}{128}$'th of the space of the memory.

In order not to store an altered data block or first data element at an address representing an existing data block or first data element, it is desired to maintain an updated knowledge of free addresses or free space on the storage medium. One manner of obtaining that knowledge is one where:

i) prior to step d), information is provided relating to the free addresses of the data storage medium which are not occupied by the data blocks and the first data elements, j) step d) comprises storing the modified data blocks at free addresses and removing the addresses from the free addresses, k) step f) comprises storing the modified first data elements at free addresses and removing the addresses from the free addresses.

One manner of determining which addresses are free is to have step i) comprise:

I) identifying at least substantially all addresses of the storage medium or a relevant part thereof and denoting these addresses free addresses, II) for each root, identifying all first data elements and data blocks of the corresponding tree element and removing the corresponding addresses from the free addresses.

In the present context, the relevant part of a storage medium may be a certain number of addresses thereof. Normally, other parts of the storage medium will be reserved for other purposes.

In that manner, updated knowledge is maintained and finding an unused address for the next altered data block or first data element is simple.

It is clear that in shadow paging or similar principles where data is copied and old data not actively deleted, the actual space taken up by the database will increase for each transaction. One solution may be to maintain the total space taken up by the data/database below e.g. a predetermined size. In this manner, the number of free addresses (when the total number of available addresses is known) may provide that information. If this limit is exceeded, a previous version of the data may be deleted and the pertaining addresses released for new altered data blocks or first data elements. Another solution is to simply maintain only a predetermined number of e.g. the latest versions of the data.

Thus, step II) may be performed only for a predetermined number of roots. In that manner, as only the data blocks and first data elements of these predetermined roots or versions are "reserved", the addresses of data blocks or first data elements of other versions will be released/free—and thereby potentially deleted over time as the pertaining addresses are selected for new altered data blocks and first data elements.

The number of root pointers (and thereby versions available) retained depends on the application area. This number ranges from 2 to any desired number—and does in principle not require an upper limit. An application like a database server might retain only a few root pointers, where a backup application would desirably not impose any limit on the number of retained root pointers.

The choice of the number of retained root pointers is a trade off between the desire of retaining old data, and the capacity of the underlying storage medium. The important fact is that the number of retained versions can be limited to a predetermined number, thus limiting the storage capacity required, and enabling reuse of storage blocks.

The limit on the number of retained root pointers enables the reuse of external data blocks, a data block can be reused when it is not referenced from any retained root pointer. The data blocks not referenced by the root pointers directly or indirectly, the free blocks, are described as in freeLists.

The data structure implementing free list must allow efficient adding and removal of blocks to and from the list. The address of a data block is augmented with the type of the data it is pointing to, the possible types being a data block and a descriptor block/first data element. The data block contains data stored by the users but not interpreted by the system. A first data element contains pointers to either first data elements or data blocks. The augmented pointers are used in the tree describing files, the file access and maintenance routines has no use of type information of the augmented pointer, but maintain those purely for the purpose of efficient handling of free list.

Thus, step II) may be performed only for a predetermined number of roots—normally a number of the youngest versions.

In one situation, step I) comprises, upon a commit operation, 1) storing the addresses of the identified data blocks and first data elements together with a reference to an identity of the new version of the data, 2) providing information relating to free addresses of the storage medium prior to the commit operation, and 3) adding stored addresses referring to an identity of a predetermined prior version of the data to the information relating to the free addresses.

A version may be given any identification—but normally these will be numbered consecutively.

A predetermined number of versions of the data may be maintained available and step 3) may then comprise adding the stored addresses referring to a version generated prior to the predetermined number of versions.

When the method further comprises storing the addresses of the identified data blocks and first data elements in one or more second data elements stored in the storage medium, a number of advantages may be seen in e.g. the fact that the free list will increase if the amount of versions or space required thereby decreases—and vice versa.

Preferably, the second data elements are linked together in a linear list.

In a preferred embodiment, the method comprises:

identifying and reserving an existing version of the data, and performing step 3) only after release of the reserved version.

In this manner, a reserved version will be maintained until released again. This means that new versions may be stored and generated—but that the data blocks and first data elements of the reserved version are not added to the free list until released.

Reserving a version has a number of advantages, such as when obtaining a snapshot of the data and when generating time consuming reports of the data. Reserving a version and then performing the reports thereon will not delay the access to further amendments of the data to the users.

Due to the fact that a reserved version may actually contain historical data which have subsequently been amended, it is preferred that a reserved version cannot be amended. Also, consistency of the data may guaranteed if no amendments are performed to the reserved version—those amendments are to be seen in the later versions.

A version may be reserved by a number of users or for a number of purposes—and only released when the version is no longer required. Subsequent to that, the addresses in the address list pertaining to the now released version may be added to the free list and subsequently reused in new versions.

In order to ensure the integrity of the data even upon direct hostile access to the storage medium, it may be preferred that each data block is encrypted prior to storing. A DES encryption is presently preferred.

Another solution is one wherein optionally or additionally each first data element is encrypted prior to storing. Especially the situation where both are encrypted, neither the data nor the structure thereof will be derivable by third persons.

As described above, the method preferably comprises collecting a number of desired changes to the data of the one or more files, preparing the new data by performing changes to the previous data and finally separately storing the new data by performing the commit operation.

In a second aspect, the invention relates to a method of generating a database, the method comprising:

providing one or more files comprising data, storing the data of the files on a data storing medium as a number of individually addressable data blocks, representing addresses of the data blocks in one or more first data elements organised in a tree structure having a root, storing additional data in the database using the above-mentioned method.

The method may comprise copying a version of the database by identifying a relevant root of a tree structure and copying the tree structure and all data elements represented by first data elements thereof. Due to the version handling ease of the invention, copying of a version is simple.

This is also seen when the method comprises retrieving a version of the data. Then the method may simply comprise identifying a root relating to the desired version and retrieving the pertaining tree structure of first data elements and all data blocks the addresses of which are represented thereby. In that manner both the data and the structure is retrieved.

In a third aspect, the invention relates to a database generated according to the above method.

BRIEF DESCRIPTION OF THE DRAWINGS

In the following, the preferred embodiment of the invention will be described with reference to the drawing wherein:

FIG. 5: Transaction Based File System state after a system crash.

DETAILED DESCRIPTION

Figures 1, 2:
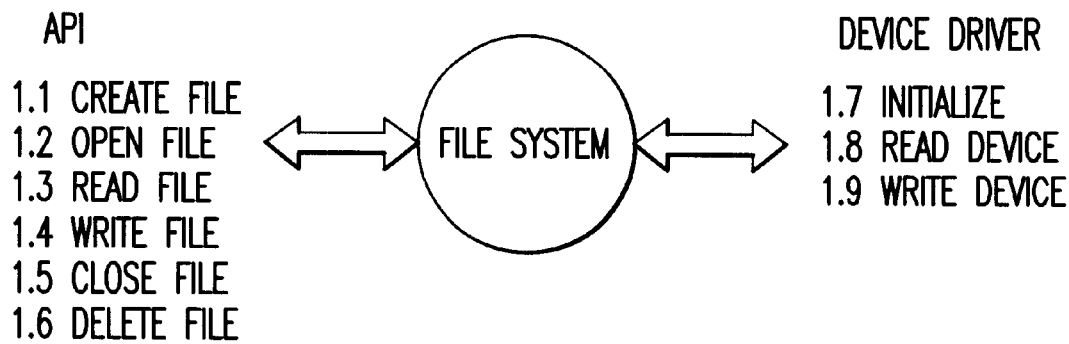
FIG. 1: File system API and device driver interface.
FIG. 2: File system updates in a traditional system.

A traditional file system API consists of functions.for creating a file (1.1), opening a file (1.2). Opening a file establishes the data structures necessary for reading data from the file and writing data to the file. Creation of a file creates an empty file and opens it. After a file have been opened it may be read from the file (1.3) and written to the file (1.4). The read and write functions allow the client to read an arbitrary amount of data to an arbitrary position in the file. When all operations on the file have been executed the file is closed (1.5), which breaks the connection to the file and releases all resources used during access of the file. The final typical API function is a delete (6) which removes the file releases resources used by the file. The file system transform the API call (1.1) to (1.6) into the simpler device driver functions. Apart from functions necessary for initialisation of the device (1.7) the primary functions of the device driver is read (1.8) from the device and write (1.9) to the device. The persistent storage device is typically block oriented, such that read and write are performed on block boundaries, and the size of the data is an even number of blocks. A typical block size if 512 bytes, is which case n * 512, where n is an integer greater than zero bytes, may be read from and written to the device.

FIG. 2 shows the chain of events for an file updates in a traditional file system. The same tabular form will be used in subsequent drawings to show chains of events. The first column in the table list the client performing the operation listed in the second column, on the file listed third column. Data given as input to the operation is, if applicable, listed in the fourth column, and output from the operation is, if applicable, listed in the fifth column. For simplicity the read and write operations are assumed to read and write all contents of the file. Assuming two clients (c1) and (c2) using the same traditional file system, both access the same file. The first client writes some data to the file f1 (2.1) then the second client reads the data from the file (2.2), the data read will be the same as the data written by the first client. Then the first client write data to f2(2.3), and the second client reads the data (2.4), again it read the data written by the first client.

Figures 3, 4:
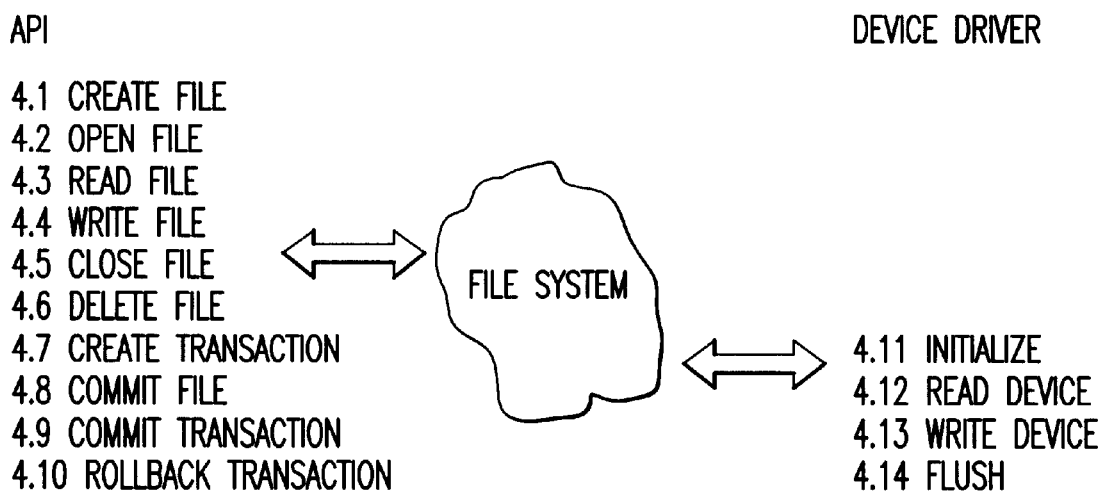
FIG. 3: Inconsistent file content after system crash.
FIG. 4: Transaction Based File system API and device driver interface.

FIG. 3 shows the chain of events which leads to an inconsistency. The contents of the two files must be the same for the system to be consistent. The client write data to f1 (3.1), and the write the same data to f2(3.2). After that operation the files are consistent. The client update f1 (3.3) but before f2 is updated (3.5) the system fails(3.4). Upon restart the client the files with different contents, thus the system is in consistent.

FIG. 4 shows transaction based file system API and device driver interface. Most of the API function are identical to the function in FIG. 3 with the following exceptions: create transaction, connect, commit, and rollback. Create transaction creates the data structure needed to control the external device. When a file is opened it is only legal to read the file, in order to write data to the file it must be connected to a transaction by the connect API function. Any number of files may be connected to a transaction, allowing the application to regard the updates to the files as atomic. When the application decides so, it may commit the transaction, in which case all the updates to the files are performed as one atomic or indivisible update, or rolled back in which case all updates are discarded. On the device driver side there is one new function: flush. The flush function informs the driver that all buffered data must be written to disk before the function returns.

FIG. 5 shows the chain of events for an update similar to the one in FIG. 3. As in 3 the contents of the two file in must be identical for the system to be consistent. The application creates a transaction, connect f1 to the transaction, writes data to f1, connects f2 to the transaction, and writes data to f2. The transaction is committed. The application creates a new transaction connect f1 to the transaction and writes data to f1. If the system crashes before the transaction is committed, neither f1 nor f2 is changed, if the system crashes after the transaction is committed both files are updated.

Figure 6:
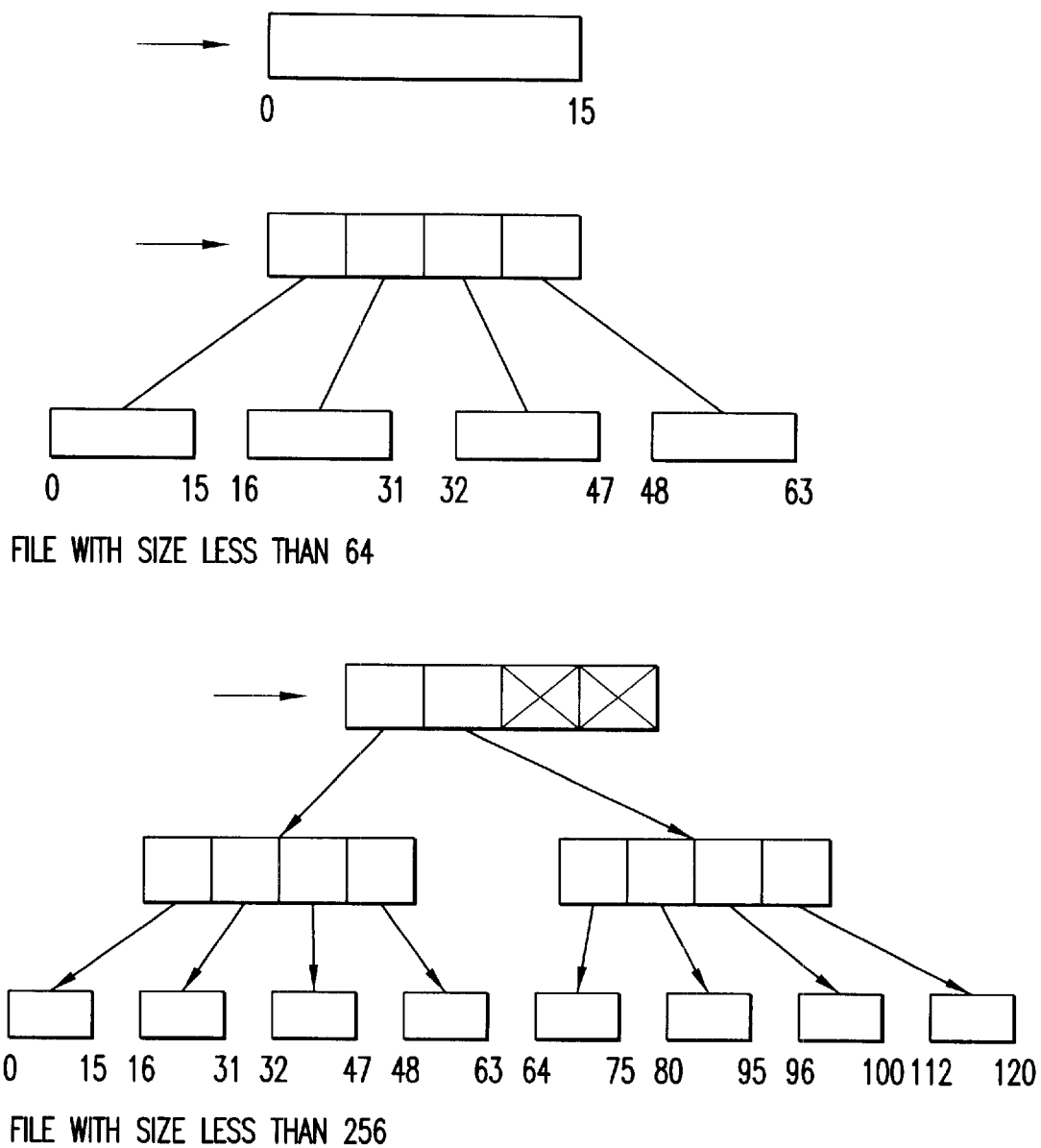
FIG. 6: Mapping a file to a block device.

FIGS. 6.1 to 6.n shows how a byte addressed API file is mapped to blocks on the device. To simplify the drawings the block size of the device is 16 bytes and that the number of blocks on the device can be represented in 4 bytes (32 bits). FIG. 6.1 show a files with a size less that 16 bytes, FIG. 6.2 show a file with a size from 17 to 64 bytes, and 6.3 shows a file with the size 65 to 256 bytes. As can be seen from the drawings the blocks are divided into two kinds, blocks containing pointers to blocks and blocks containing data, the structure is a tree where all the leaves are data blocks, each holding 16 bytes of data. Please note that the for a complete file is represented by the number of the root block, so with knowledge of the block size, the number of pointers per block, and the size of the file and the root block, the data block holding any byte of the file may be located. To locate the 9'th byte of a file with size 14, read the root block, the pointer to the data is at offset 9/4=2 in the block, which points to a data block. Read the data block, the byte is at offset 1 in the block.

Figure 7:
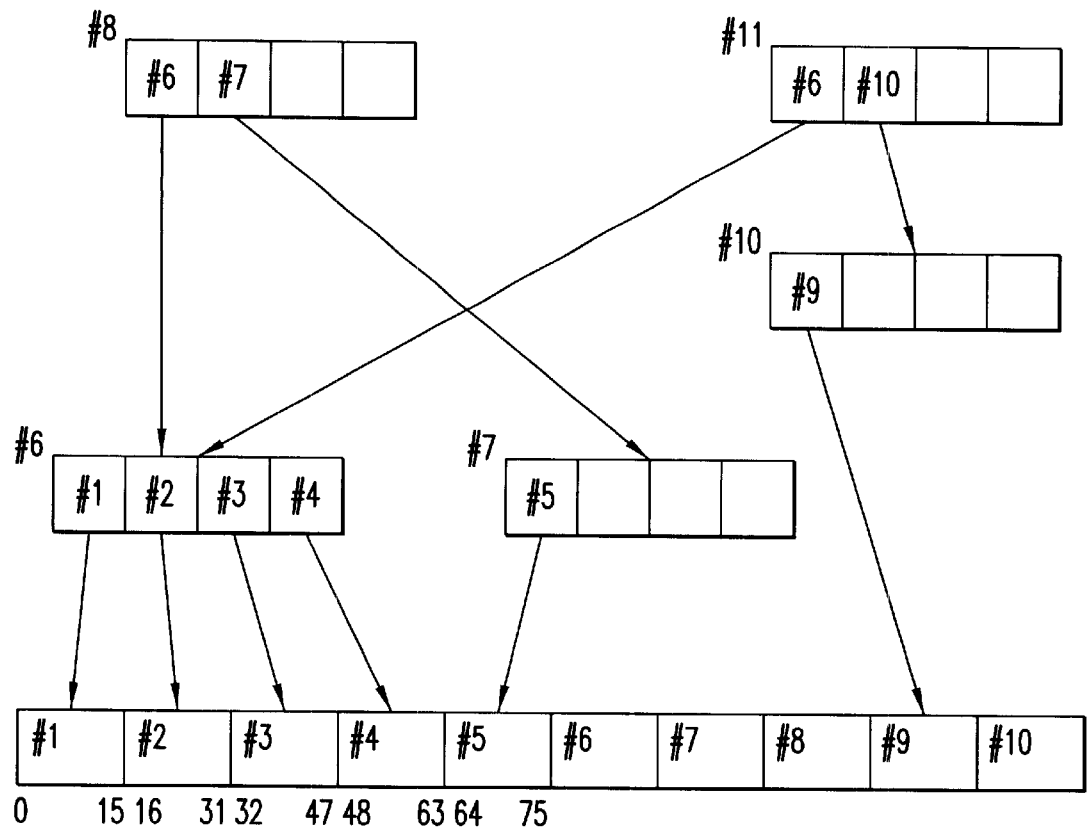
FIG. 7: Updating a file.

FIGS. 7.1 to 7.n show steps involved in updating a file. Lets us assume a file with a size of 80 bytes, 7.1. We want to update byte 75. The root block is block 8, we read that the pointer to the next level is 75/(4*16)=1. At offset 1 we find a reference to block 7, we are searching for byte 11 in block 7. We read the pointer at 11/16=0, and find a reference to block 5. Block 5 is a data block and the byte is byte at offset 11 in that block. We we read the block and update the byte at offset 11 to the new value. Instead of writing the data back in the same block on the disk we allocate a new, block 9 and write the updated data to that block. We also need to updates block 7 with the new pointer value, we do that by allocating a new block #10 and write the updated block to that. We do the same with the root block and get new root block #11. As can be seen from the drawing the we can access the old file contents by the root block 8, and the new file content by the new root pointer #11.

Figure 8:
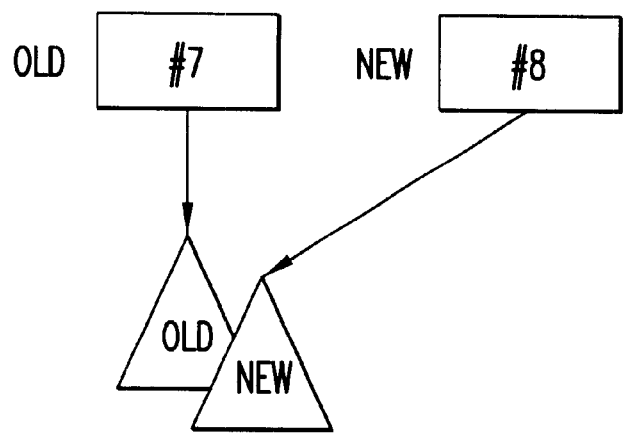
FIG. 8: Committing a transaction.

FIG. 8 shows the steps involved in committing a transaction. A designated area of the persistent storage media is used to store the data required for accessing the filing system. This area is called the super block. The most important piece of data is the root pointers which establish access to the complete system. When a transaction is committed the root pointer is written to the super block. If the transaction is rolled back, instead of committed, the super block is simply not updated.

Figure 9:
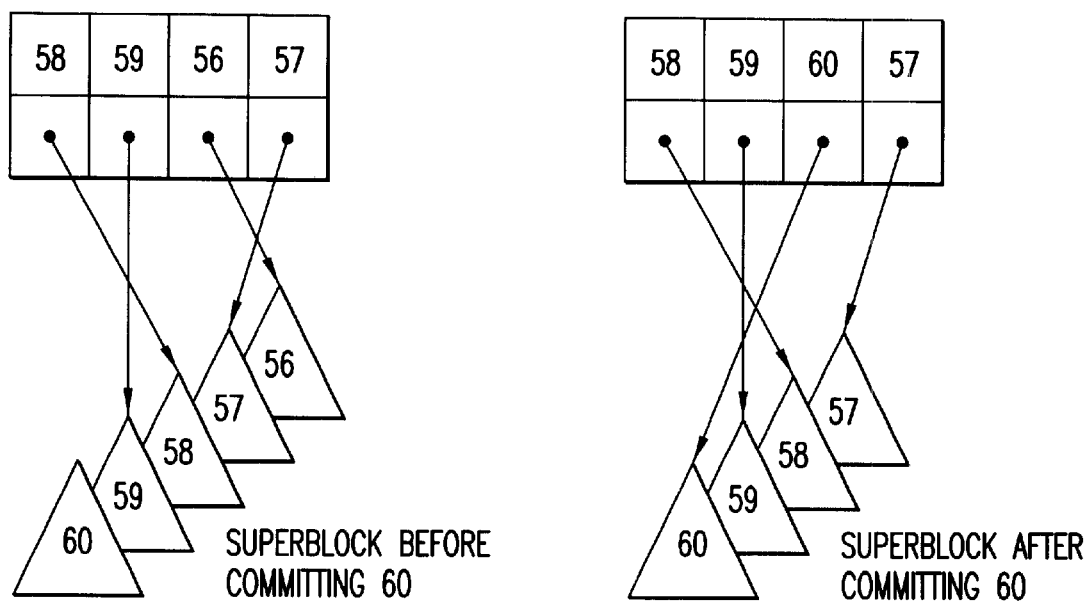
FIG. 9: Creation of version.

FIG. 9: storing of versions. The drawing assumes a maximum of 4 versions that are retained on the disk. As the maximum number of versions retained is known, the super block is able to at the same time point to all these versions. When committing a transaction the oldest version is always overwritten, the oldest being the one with the smallest version number. Overwriting a version prohibits further use of the version that were overwritten.

Upon a commit operation, a linked list of elements similar to the descriptor blocks/first data elements is generated with the addresses of those data blocks and descriptor blocks which.have,been replaced or amended in the transaction completed with the commit operation.

When the actual version of the data is released, the addresses of the pertaining version are also released and added to a list holding all free addresses.

This list of free addresses will initially be all addresses of the available area of the storing medium and will be reduced by addresses subsequently used during commit operations.

During operation, a number of versions will be stored and available—and the storage medium will at the same time hold the free list and the lists pertaining to the available versions.

The advantage of this setup is that if the total space required by the versions is relatively large—the total space required by the free list will be relatively small due to fewer addresses being free—and vice versa.

Figure 10:
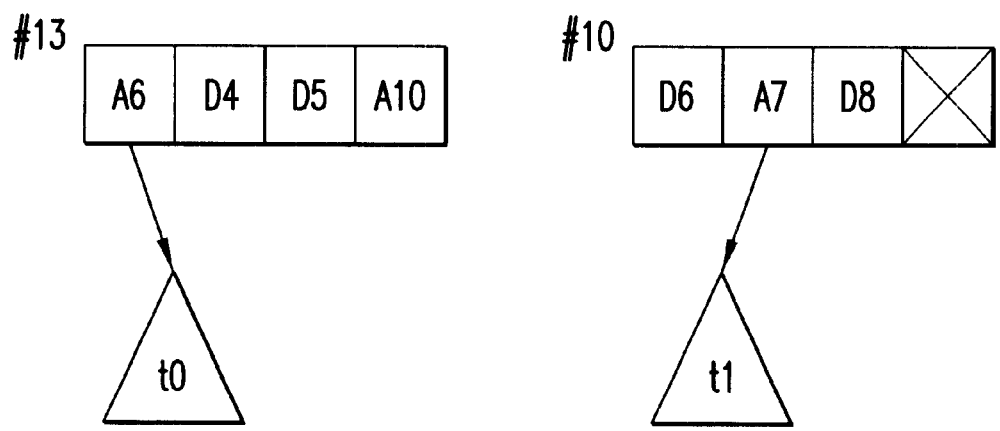
FIG. 10: Freelists.

FIG. 10 show the structure of a free list, for simplicity the number of pointers per block is assumed to be 4.

Data blocks are masked with D and then a number, pointer blocks are marked with A and the block number. The start of the free list is designated by the descriptor block A13, it contains a root of a tree, typically a deleted file, the free data blocks D4 and D5. The last slot is a pointer to the next block in the free list A10. Block 10 has 2 free data blocks D6 and D8, and a tree A7. Trees will normally be entered when a whole file is deleted. In that situation the tree will be both the data blocks of the file as well as the tree structure (first data elements) thereof.

When inserting a "version list" into the free list it is always done in the beginning of the list. If the depth,of the tree (a depth which is described above) is limited, the depth of the free list will be that depth plus one.

The depth of the free list is defined as the maximum number of descriptors to read before reaching a data block, without counting the link slot (e.g. A6 pointing to the tree to), which is shown as the last slot but could actually be placed anywhere. It is not necessary to count the link slot as the link slot will be the last to access, thus the buffer space can be reused.

Naturally, when free addresses are selected to be occupied during a commit operation, these addresses are to be removed from the free list. This will in certain situations cause that a second data element (a descriptor block of the free list) is actually empty—and thereby should be free. In that situation, the address of this emptied block should be either entered into another descriptor block of the free list—or simply be buffered and used during the next commit operation.

What is claimed is:

1. A method for storing information stored in one or more files on a permanent storage medium, comprising the steps of:

storing data transaction-wise according to a shadow paging principle, retaining, in a commit operation, the previous data and their physical storage on the storage medium together with a separate storage on the storage medium representing new data as changes to the previous data, the previous data and the changes together constituting, upon commit, a new version of the data, both the previous and the new versions of the data being separately accessible, wherein the data are stored as a number of individually addressable data blocks, addresses representing the physical storage of the individual data blocks being stored in a tree structure of one or more first data elements, and wherein the storing step comprises:

identifying data blocks to be modified, copying the identified data blocks, performing the modification(s) on the copied data blocks, storing the modified data blocks at addresses not coinciding with any of the addressable data blocks or any of the first data elements, for each identified data block, identifying one or more of the first data elements of the tree structure from a root of the tree structure to the data block, copying each identified data element at an address not coinciding with any of the addressable data blocks or any of the first data elements, replacing, in each copied first data element, the address of the identified data block or first data element with the address of the corresponding modified data block or first data element, and providing a new root of the modified tree structure and having the new root represent the modified first data element corresponding to the first data element represented by the root of the tree structure.

2. The method according to claim 1, wherein the data of a file is stored as a number of data blocks and wherein a change of the contents of the file, the previous data, results in a change of the contents of one or more of the data blocks.

3. The method according to claim 1, wherein a single commit operation causes all changes due to the transaction to all of the one or more files.

4. The method according to claim 1, wherein, during operation of a program accessing the database, at least a number of previous versions representing the maximum simultaneously outstanding transactions plus two are retained.

5. The method according to claim 1, wherein the commit operation comprises the step of providing a new root.

6. The method according to claim 1, wherein:

prior to the step of storing the modified data blocks, information is provided relating to the free addresses of the data storage medium which are not occupied by the data blocks and the first data elements, the step of storing the modified data blocks comprises storing the modified data blocks at free addresses and removing the addresses from the free addresses, and the step of copying each identified first data element comprises storing the modified first data elements at free addresses and removing the addresses from the free addresses.

7. The method according to claim 6, wherein the step of information being provided relating to the free addresses comprises:

I) identifying at least substantially all addresses of the storage medium or a relevant part thereof and denoting these addresses free addresses, and II) for each root, identifying all first data elements and data blocks of the corresponding tree element and removing the corresponding addresses from the free addresses.

8. The method according to claim 7, wherein the step II) is performed only for a predetermined number of roots.

9. The method according to claim 6, wherein the step of information being provided relating to the free addresses comprises, upon a commit operation, 1) storing the addresses of the identified data blocks and first data elements together with a reference to an identity of the new version of the data, 2) providing information relating to free addresses of the storage medium prior to the commit operation, and 3) adding stored addresses referring to an identity of a predetermined prior version of the data to the information relating to the free addresses.

10. The method according to claim 9, wherein a predetermined number of versions of the data are maintained available and where step 3) comprises adding the stored addresses referring to a version generated prior to the predetermined number of versions.

11. The method according to claim 9, further comprising the steps of:

identifying and reserving an existing version of the data, and performing step 3) only after release of the reserved version.

12. A method according to claim 1, further comprising the step of:

storing the addresses of the identified data blocks and first data elements in one or more second data elements stored in the storage medium.

13. The method according to claim 12, wherein the second data elements are linked together in a linear list.

14. The method according to claim 1, wherein each data block is encrypted prior to storing.

15. The method according to claim 1, wherein each first data element is encrypted prior to storing.

16. The method according to claim 1, wherein the method comprising collecting a number of desired changes to the data of the one or more files, preparing the new data by performing changes to the previous data and finally separately storing the new data by performing the commit operation.

* * * * *